United States Patent [19]
Matsuyama et al.

[11] Patent Number: 5,383,189
[45] Date of Patent: Jan. 17, 1995

[54] METHOD AND CIRCUIT FOR DEMULTIPLEXING DIGITAL SIGNALS CAPABLE OF ASBORBING DESTUFFING JITTER

[75] Inventors: Kazunori Matsuyama, Miyagi; Naoto Iga, Tokyo, both of Japan

[73] Assignee: NEC Corporation, Tokyo, Japan

[21] Appl. No.: 850,905

[22] Filed: Mar. 13, 1992

[30] Foreign Application Priority Data

Mar. 15, 1991 [JP] Japan .................................. 3-074318

[51] Int. Cl.⁶ .............................................. H04J 3/06
[52] U.S. Cl. ................................ 370/105.3; 375/118
[58] Field of Search ................... 370/105.3, 102, 100.1, 370/112, 108, 105.1, 105.4, 105.5, 106, 108; 375/118, 114, 116, 117

[56] References Cited

U.S. PATENT DOCUMENTS

| | | | |
|---|---|---|---|
| 4,429,386 | 1/1984 | Graden | 370/105.3 |
| 5,014,271 | 5/1991 | Fujimoto et al. | 370/105.3 |
| 5,067,126 | 11/1991 | Moore | 370/102 |
| 5,124,977 | 6/1992 | Kozaki et al. | 370/60 |

FOREIGN PATENT DOCUMENTS 468625  3/1992  Japan .

OTHER PUBLICATIONS

*AT&T*, Preliminary Data Sheet of "T7290 DS1/T1/CEPT Line Interface", (Sep. 1990) pp. 1–20.

*Primary Examiner*—Douglas W. Olms
*Assistant Examiner*—Ajit Patel
*Attorney, Agent, or Firm*—Foley & Lardner

[57] ABSTRACT

The present invention provides a method and circuit for demultiplexing digital signals which generates no errors even when destuffing jitters are heavy. A buffer memory performs digital smoothing of the jitters which are periodically generated in lower order signals demultiplexed from higher order signals by a demultiplexing circuit. An analog IC performs resmoothing of the lower order signals which have been smoothed by the buffer memory, and thereafter performs digital/analog conversion thereof and outputs the lower order signals which have no jitters, through a transformer.

5 Claims, 3 Drawing Sheets

METHOD AND CIRCUIT FOR DEMULTIPLEXING DIGITAL SIGNALS CAPABLE OF ASBORBING DESTUFFING JITTER

BACKGROUND OF THE INVENTION

1. Field of the Invention

The present invention relates to a method and circuit for demultiplexing digital signals which are capable of absorbing destuffing jitters caused by demultiplexing.

2. Description of Related Art

FIG. 1 is a block diagram showing an example of a digital signal demultiplexing circuit of the conventional type.

Demultiplexing circuit 51 (hereinafter referred to as "DMUX 51") receives higher order digital signals structured in frames and demultiplexes them into lower order signals. Analog IC 53 receives the lower order digital signals demultiplexed by DMUX 51 and performs smoothing thereof by means of inner memory 55 and thereafter performs digital/analog conversion of the signals. Transformer 54 executes unipolar/bipolar conversion of the signals according to outputs of analog IC 53.

However, the digital data demultiplexing circuit of the conventional type described above is influenced by the jitter absorption characteristic of the analog IC and generates errors when it receives jitters exceeding its performance.

SUMMARY OF THE INVENTION

The present invention has been developed to remove the problems of the conventional type circuit described above, and its object is to provide a method and circuit for demultiplexing digital signals which generate no errors even when the signals exceeding the jitter absorption capability of the analog IC of the circuit is received.

In order to achieve the above object, the digital signal demultiplexing method of the present invention comprises a first step of demultiplexing frame-structured higher order digital signals and separating them into lower order digital signals, a second step of digitally smoothing jitters, which are periodically generated in the lower order signals, the smoothing being performed by writing into a buffer memory the lower order signals separated by demultiplexing and reading them out from the buffer memory, a third step of resmoothing the lower order signals which have been smoothed by the buffer memory, and thereafter performing digital-/analog conversion thereof and a fourth step of performing unipolar/bipolar conversion of the signals which have been processed through digital/analog conversion thereof.

Further, the circuit for demultiplexing the digital signals of the present invention comprises a demultiplexing circuit for receiving the frame-structured higher order digital signals and demultiplexing them into lower order digital signals, a buffer memory for digitally smoothing jitters, which are periodically generated in the lower order signals demultiplexed by the demultiplexing circuit, by the writing the lower order signals separated by demultiplexing and reading them out, an analog IC for finishing resmoothing of the lower order signals which had been smoothed by the buffer memory and for performing digital/analog conversion of the lower order signals and a transformer for performing unipolar/bipolar conversion of the signals which have already been processed through digital-/analog conversion thereof by means of the analog IC.

Further, the circuit for demultiplexing the digital signals of the present invention comprises a demultiplexing circuit for receiving frame-structured higher order digital signals, demultiplexing them into lower order digital signals, separating the lower order signals into groups, buffer memories, each of which receives one of the groups of the lower order signals and digitally smoothes the jitters which are periodically generated in the received group of the lower order signals demultiplexed by the demultiplexing circuit, by writing the lower order signals separated by demultiplexing and reading them out, analog ICs, each of which is connected to one of the smoothing buffer memories, each of which resmoothes the signals which had been smoothed by the buffer memory and performs digital/analog conversion of the resmoothed lower order signals and transformers, each of which is connected to one of the analog ICs, performing unipolar/bipolar conversion of the signals which have already been processed through digital/analog conversion thereof by means of the analog IC connected to itself.

It is preferable that the buffer memory reads out the lower order signals in synchronization with a read clock other than a write clock with which the smoothing buffer memory writes the above lower order signals.

Further preferably, the buffer memory performs FIFO operation and the analog IC performs resmoothing in synchronism with the read clock which is supplied to the buffer memory, having an internal memory for resmoothing.

The smoothing in the present invention means an arrangement of the pulse line to arrange it into equal spaces which have become unequally spaced due to destuffing operation of the stuffed signals.

The above and other objects, features and advantages of the present invention will become apparent from the following description referring to the accompanying drawings which illustrate an example of a preferred embodiment of the present invention.

DESCRIPTION OF THE PREFERRED EMBODIMENT

Demultiplex circuit 1 (hereinafter referred to as "DMUX 1") demultiplexes frame-structured higher order digital signals HS into lower order digital signals, and by destuffing the stuffed pulses outputs them as lower order digital signals LS together with write clock WR CLK and read clock RD CLK.

Buffer memory 2 for smoothing writes destuffed signals LS in synchronization with write clock WR CLK, then reads written signals LS synchronizing with read clock RD CLK and outputs them as signals MS. This write/read action is performed by FIFO operation.

Therefore, jitters to be generated periodically by demultiplexing by means of DMUX 1 can be digitally substantially smoothed.

Analog IC 3 receives signals MS inputted from buffer memory 2, and performs smoothing of the signals by using internal memory 5 and the successive digital-/analog conversion thereof, then outputs them to transformer 4 synchronizing with read clock RD CLK transmitted from DMUX 1.

Transformer 4 performs unipolar/bipolar conversion of output signals transmitted from analog IC 3.

Therefore, even if lower order signals LS contain jitters exceeding the jitter absorption capacity of analog IC 3, no error is generated in the signal data because the jitters have been previously reduced by means of buffer memory 2.

Figure 1:
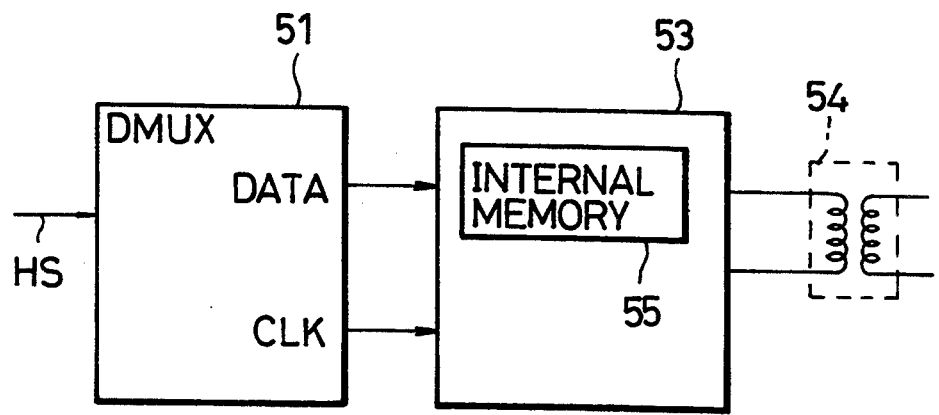
FIG. 1 is a block diagram showing an example of the conventional type.
Figure 2:
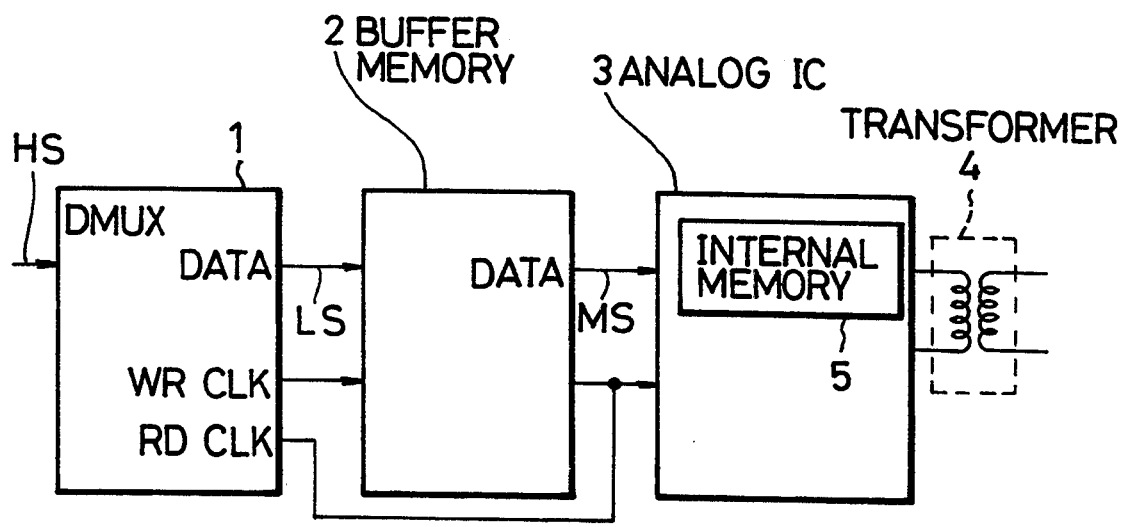
FIG. 2 is a block diagram showing an embodiment of a circuit for demultiplexing digital data of the present invention.
Figure 3:
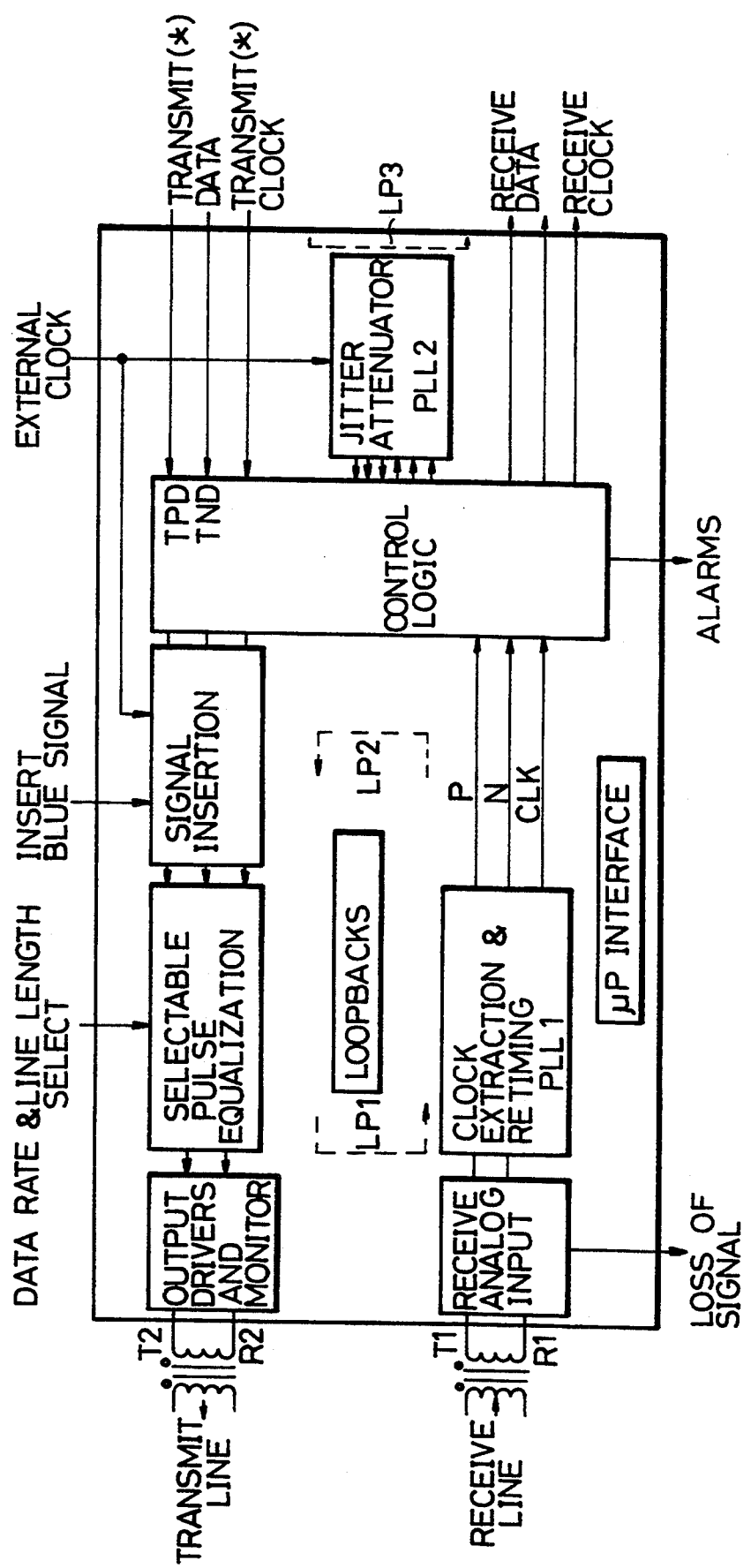
FIG. 3 is a block diagram showing an example of an analog IC which is usable for the embodiment of FIG. 2.

Further, a concrete example of analog IC 3 will be described below. As a typical example of analog IC 3, there is T 7290 (or T 5290) of A T & T, as shown in FIG. 3. In this case, read clock RD CLK of the embodiment in FIG. 2 should be supplied as a transmit clock (refer to mark *) and signals MS should be supplied as a transmit data (refer to mark *).

Figure 4:
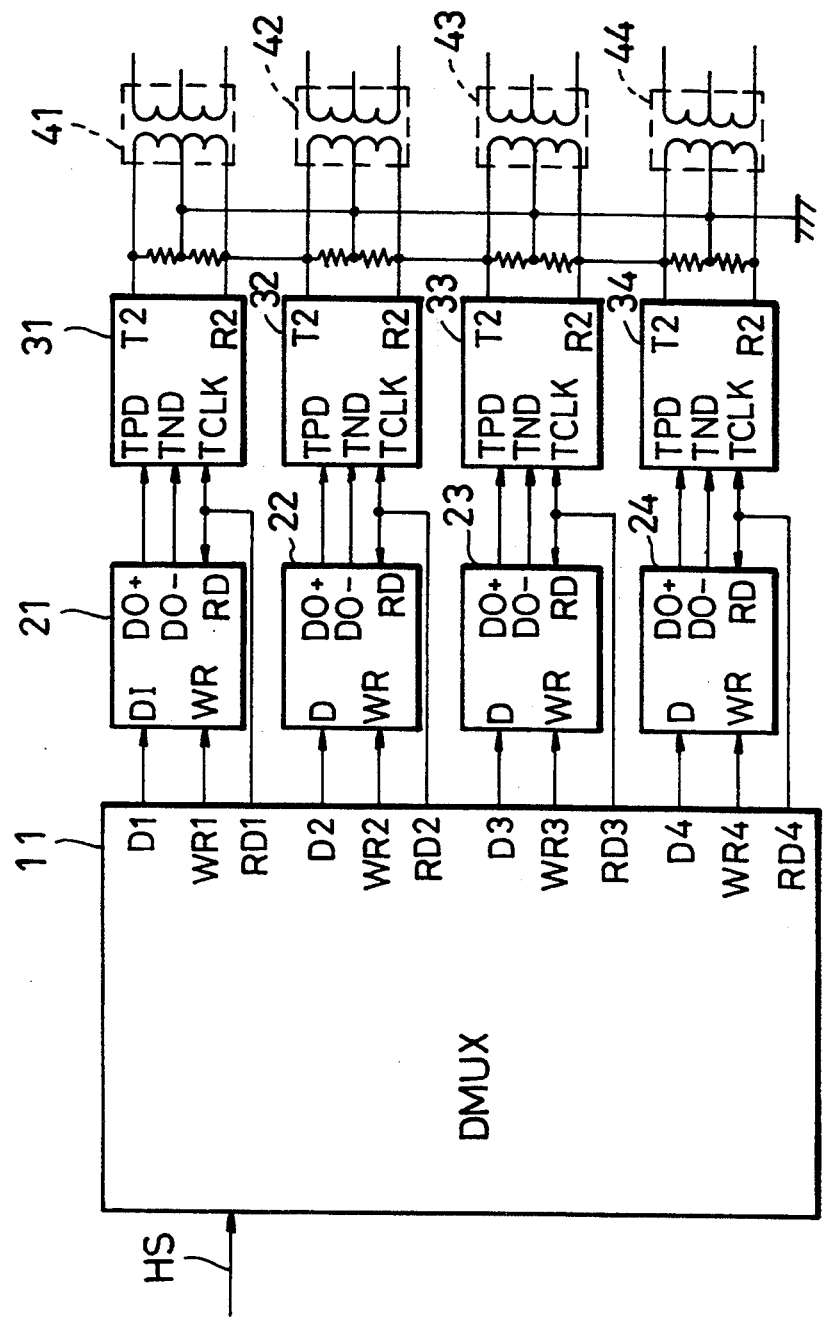
FIG. 4 is a block diagram showing an embodiment having lower order signal data divided into four (4) systems.

As for the case in which higher order signals are demultiplexed into lower order signals of four systems, it is preferable to construct the system as shown in FIG. 4.

DMUX 11 outputs lower order signals D1, D2, D3 and D4 of the four systems together with write clocks WR1, WR2, WR3, WR4 and read clocks RD1, RD2, RD3 and RD4, respectively. Buffer memories 21, 22, 23 and 24 for smoothing perform smoothing of the above signals D1, D2, D3 and D4, respectively, and analog ICs 31, 32, 33 and 34, respectively, perform resmoothing thereof respectively.

After finishing digital/analog conversion, the resmoothed signals are output through transformers 41, 42, 43 and 44, respectively.

Further, symbols DO+ and DO− of the buffer memories 21, 22, 23 and 24 correspond to a positive polarity and a negative polarity, respectively, of the bipolar signals.

As can be understood from the above embodiment, it becomes possible to eliminate data errors by providing a buffer memory in the preceding stage of the analog IC and having resistibility against destuffing jitters, even though the destuffing jitters to be generated in the demultiplexing operation exceed the jitter absorption capacity of the analog IC.

It is to be understood that variations and modifications of the method and circuit for demultiplexing of the digital data of the present invention which are capable of absorbing the destuffing jitters disclosed herein will be evident to those skilled in the art. It is intended that all such modifications and variations be included within the scope of the appended claims.

What is claimed is:

1. A circuit for demultiplexing digital signals comprising:
   a demultiplexing circuit for receiving frame-structured higher order digital signals, demultiplexing them into lower order digital signals, separating the lower order signals into groups;
   buffer memories, each of which receives one of the groups of the lower order signals, each of which digitally smoothes the jitters which are periodically generated in the received group of the lower order signals demultiplexed by the demultiplexing circuit, by writing the lower order signals separated by demultiplexing into the buffer memories and reading them out;
   analog ICs, each of which is connected to one of the smoothing buffer memories, finishing resmoothing of the signals which had been smoothed by the buffer memory connected to itself and for performing digital/analog conversion of the resmoothed lower order signals; and
   transformers, each of which is connected to one of the analog ICs, performing unipolar/bipolar conversion of the signals which have already been processed through digital/analog conversion thereof by means of the analog IC connected to itself.

2. A circuit for demultiplexing digital signals, comprising:
   a demultiplexing circuit for receiving frame-structured higher order digital signals and demultiplexing them into lower order digital signals;
   a buffer memory connected to the demultiplexing circuit for digitally smoothing jitters, which are periodically generated in the lower order signals demultiplexed by the demultiplexing circuit, by writing the lower order digital signals separated by demultiplexing into the buffer memory and reading them out;
   wherein the buffer memory reads out the lower order digital signals in synchronization with a read clock other than a write clock with which the buffer memory writes the lower order digital signal;
   an analog IC connected to the buffer memory for further resmoothing the lower order digital signals which had been smoothed by the smoothing buffer memory and for performing digital/analog conversion on the further smoothed lower order digital signals; and
   a transformer connected to the analog IC for performing unipolar/bipolar conversion of the signals received from said analog IC.

3. A circuit for demultiplexing digital signals according to claim 2, wherein the analog IC has an internal memory for resmoothing performs resmoothing in synchronism with the read clock.

4. A circuit for demultiplexing digital signals, comprising:
   a demultiplexing circuit for receiving frame-structured higher order digital signals, demultiplexing them into lower order digital signals, separating the lower order digital signals into groups;
   buffer memories, each of the buffer memories connected to the demultiplexing circuit and receives one of the groups of the lower order digital signals, each of the buffer memories digitally smoothes jitters which are periodically generated in the received one of the groups of the lower order signals demultiplexed by the demultiplexing circuit, by writing the lower order digital signals separated by demultiplexing into the buffer memories and reading them out;
   wherein the buffer memory reads out the lower order digital signals in synchronization with a read clock other than a write clock with the buffer memory writes the lower order digital signals;
   analog ICs, each of the analog ICs connected to one of the buffer memories, for further resmoothing the lower order digital signals which had been smoothed by the buffer memory connected to a corresponding one of the analog ICs and for performing digital/analog conversion of the further resmoothed lower order digital signals; and transformers, each of the transformers connected to one of the analog ICs, wherein the transformers perform unipolar/bipolar conversion of the digital-/analog converted signals that are received from the corresponding one of the analog ICs.

5. A circuit for demultiplexing digital signals according to claim 4, wherein the analog IC having an internal memory for resmoothing performs resmoothing in synchronism with the read clock.

* * * * *